April 27, 1943.  H. P. PHILLIPS ET AL  2,317,638

OIL LINE METERING PLUG

Filed July 5, 1941

INVENTOR.
Harold P. Phillips
Walter C. Rivers
BY Earl F. Chappell
ATTORNEYS

Patented Apr. 27, 1943

2,317,638

UNITED STATES PATENT OFFICE 2,317,638

OIL LINE METERING PLUG

Harold P. Phillips and Walter C. Rivers, Hastings, Mich., assignors to Hastings Manufacturing Company, Hastings, Mich.

Application July 5, 1941, Serial No. 401,282

4 Claims. (Cl. 138—44)

This invention relates to improvements in oil line metering plug.

The main objects of this invention are:

First, to provide an improved metering or flow restricting plug for the oil line of an internal combustion engine leading to crank shaft and cam shaft bearings, enabling proper pressure to be maintained in the crank shaft main and connecting rod bearings, regardless of wear at the cam shaft bearings.

Second, to provide an apertured oil restricting plug of the foregoing type which is not subject to being rendered inoperative by the collection of dirt and foreign matter in the oil at the aperture or orifice of the plug to impede flow of oil therethrough.

Third, to provide a plug or similar device of the type described which is exceedingly simple and inexpensive in construction, which may be installed in the oil line with little time or trouble, is effectively retained therein, and which functions effectively when installed, throughout the life of the engine.

Further objects relating to details and economies of the invention will definitely appear from the description to follow. The invention is defined in the claims.

A structure embodying the features of our invention is illustrated in the accompanying drawing, in which.

Figure 1:
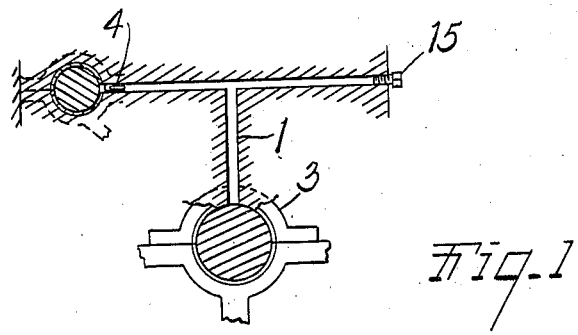
Fig. 1 is a diagrammatic view illustrating the relation of the cam shaft and crank shaft bearings in a conventional internal combustion engine and the manner in which the plug of my invention is applied to the oil circulating line therebetween.

In the operation of internal combustion engines it frequently happens that the cam shaft bearings become worn with resultant loss of oil therethrough from the oil line with which said bearings are lubricated. This produces a drop in pressure at the main and connecting rod bearings of the engine crank shaft, and consequent danger of destruction thereof. It is the purpose of the present invention to provide means for obviating the aforesaid drop in pressure by permanently restricting the flow of oil to the cam shaft bearings to a predetermined small though adequate amount, which amount is maintained constant throughout the life of the engine regardless of wear at the cam shaft bearings. More particularly, the invention contemplates an apertured metering plug for the foregoing purposes which is highly effective in functioning as described and which has provision for preventing the same from being rendered inoperative by clogging due to the accumulation of dirt and foreign matter in the oil.

Referring to the drawing, the reference numeral 1 generally designates the oil line of conventional type leading to the crank shaft bearing 3 thereof whereby oil is supplied under pressure to the latter. The reference numeral 4 generally designates the metering plug of our invention, which is inserted in and frictionally held in said oil line immediately adjacent the cam shaft bearing in the manner illustrated in Fig. 3. This plug consists of a cap-like member stamped or drawn from mild spring steel in strip form and is provided with wedge-shaped longitudinal recesses 6 in either side and opening to the end thereof defining elongated, concave friction gripping wings 7 disposed in opposed mutually facing relation to one another. These wings are springingly compressible when the plug is inserted and pressed into the oil line in the manner shown in Fig. 3 whereby to exert substantial spring tension gripping action on the oil line and thereby hold the plug in position.

Figure 2:
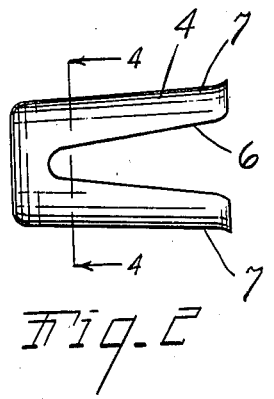
Fig. 2 is an enlarged view in side elevation of the plug of my invention.
Figure 3:
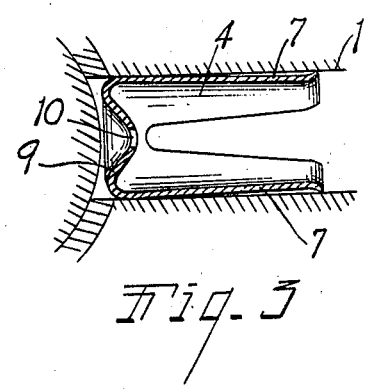
Fig. 3 is a fragmentary enlarged sectional view illustrating the operative relationship of the present plug to the oil line referred to above.
Figure 4:
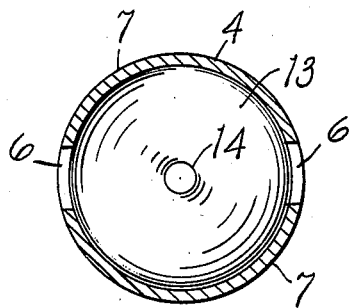
Fig. 4 is an enlarged view in section on line 4—4 of Fig. 2 further illustrating details of the plug construction.

Referring to Figs. 2 and 3, it will be noted that the recesses 6 terminate short of the transverse wall or head 8 of the plug at the opposite end thereof and that the said wall is formed in such manner as to provide generally conical indentation 9 extending within the plug or in the direction against the direction of the flow of the oil stream. This conical indented portion 9 is centrally apertured at 10 to provide a small orifice of approximately .040 inch diameter serving to meter the amount of oil admitted to the cam shaft bearing. Sufficient oil passes through metering orifice 10 to maintain the cam shaft bearing or bearings properly lubricated, and this amount is maintained constant throughout the life of the engine.

The reversely turned or indented conical wall portion 9 is of great importance in the present plug construction inasmuch as it deflects particles of dirt or foreign matter in the oil to either side of orifice 10, preventing the same from lodging in the orifice or accumulating around the sides of the same so as to eventually reduce the flow therethrough or even stop the same.

The foregoing metering plug devices are simple, inexpensive and readily installed. Thus, in a conventional oil line arrangement it is only necessary to remove the tapped closure 15 covering an end of the oil line bore in the cylinder block to enable a plug to be inserted in the oil line and pressed into place. The plugs function effectively throughout their life for the intended purpose, and are not rendered inoperative during the life of the engine, regardless of the fact that their function of restricting or impeding the flow of oil might ordinarily be expected, lacking the provisions of our invention, to eventually result in clogging and rendering the same inoperative.

Embodiments of the invention which incorporate the principles of the invention in a highly desirable manner have been illustrated and described. It should be understood that the foregoing terminology is used descriptively rather than in a limiting sense, and with full intention to include equivalents of the features shown and described, within the scope of the following claims.

Having thus described our invention what we claim as new and desire to secure by Letters Patent is:

1. An oil restricting plug of the type described comprising a resilient sheet steel member of generally cylindrical, elongated section having a transverse wall at one end thereof tapered axially of said member in conical outline, said member being provided with integral spaced spring arms of concave section extending from said wall longitudinally of the member for engagement under spring tension with an oil line, the taper of said conical wall extending inwardly, radially and longitudinally of said member and reversely of the direction of flow in said line, the wall being provided with a small central metering orifice which is maintained free from obstruction by foreign particles in the oil by reason of the conical outline of said wall on either side of the orifice.

2. An oil restricting plug of the type described comprising a resilient sheet metal member of generally cylindrical elongated section having a transverse wall tapered axially inwardly of said member, said member being provided with spring means extending longitudinally of the member for engagement under spring tension with an oil line, said tapered transverse wall extending reversely of the direction of flow of said line and being provided with a metering aperture which is maintained free from obstruction by foreign particles in the oil by reason of the tapered outline of said wall.

3. An oil line restricting plug adapted for insertion in an oil line to restrict the flow of oil therethrough, comprising a resilient stamped generally cylindrical sheet metal member frictionally engageable in the oil line, said member having a conical transverse end wall tapered axially and inwardly of the member and provided with a central restricting aperture spaced axially of the periphery of the wall in the direction reverse of the direction of oil flow relative to the plug whereby to prevent lodgment of particles in the oil in said aperture.

4. An oil duct restricting plug adapted for insertion in an oil duct to restrict the flow of oil therethrough comprising a hollow, generally cylindrical member provided with a conical transverse duct plugging wall tapered axially and inwardly of the member and having a central restricting orifice at the apex thereof, said plug having frictional retaining engagement with a wall of an oil duct, the taper of said wall extending reversely of the flow of oil in the duct.

HAROLD P. PHILLIPS.
WALTER C. RIVERS.